United States Patent [19]
Betts et al.

[11] Patent Number: 5,659,581
[45] Date of Patent: Aug. 19, 1997

[54] MODEM RECEIVER PRE-EMPHASIS

[75] Inventors: William Lewis Betts, St. Petersburg; Keith Alan Souders, Tampa, both of Fla.

[73] Assignee: Paradyne Corporation, Largo, Fla.

[21] Appl. No.: 354,978

[22] Filed: Dec. 13, 1994

[51] Int. Cl.⁶ .................................................. H04L 7/00
[52] U.S. Cl. .......................... 375/296; 375/346; 375/348; 375/350; 375/229; 370/286; 370/289; 370/290; 379/406; 379/410
[58] Field of Search ........................................ 375/222, 285, 375/296, 346, 348, 350, 229, 332; 370/32, 32.1, 282, 286, 289, 290; 379/406, 410, 411

[56] References Cited

U.S. PATENT DOCUMENTS

| | | | |
|---|---|---|---|
| 5,008,903 | 4/1991 | Bett et al. | 375/296 |
| 5,280,473 | 1/1994 | Rushing et al. | 370/32.1 |

*Primary Examiner*—Wellington Chin
*Assistant Examiner*—Jean B. Corrielus
*Attorney, Agent, or Firm*—Thomas, Kayden, Horstemeyer & Risley

[57] ABSTRACT

A echo-canceling modem uses pre-emphasis in both the transmitter and receiver sections. In particular, the receiver section of the modem processes a received signal with a pre-emphasis filter before performing echo cancellation on the received signal. The receiver pre-emphasis filter is identical to the transmitter pre-emphasis filter, i.e., the pre-emphasis added in the receiver is the same as the pre-emphasis added in the transmitter.

7 Claims, 1 Drawing Sheet

MODEM RECEIVER PRE-EMPHASIS

BACKGROUND OF THE INVENTION

The present invention relates to data communications equipment, e.g., modems, and, more particularly, to echo-canceling modems.

Typically, in a switched data connection, data communications equipment, e.g., a modem, is coupled to a central office of the public switched telephone network (PSTN) through a "local-loop," e.g., a pair of telephone lines. As in all communications systems, the particular communications channel performs some filtering of a transmitted signal communicated from the modem to the central office. This filtering effect of the communications channel is also known as the "channel response," or "frequency response." Unfortunately, the channel response of the local-loop typically does not provide a flat response but, rather, the gain decreases with increasing frequency. In other words, the higher frequency components of the transmitted signal become more attenuated than the lower frequency components of the transmitted signal. At low data rates this effect is not important because the spectrum of the transmitted signal does not have significant, if any, high-frequency components. However, as data rates increase, this effect begins to distort the transmitted signal. In particular, for high-speed data signals the local-loop channel response causes the spectral energy of the high-speed data signal to drop with increasing frequency. Consequently, the spectrum of the received high-speed data signal at the central-office-end of the local loop is severely attenuated at the band-edge of the communications channel.

As a result, it is known in the art to use a technique known as "transmit pre-emphasis" to improve performance of a high-speed data communications system. In transmit pre-emphasis, before a data signal is transmitted, the data signal is shaped by a filter whose frequency response is exactly opposite to the channel response of the communications channel, e.g., the above-mentioned local-loop. That is, the transmit pre-emphasis filter boosts the high frequency components of the data signal and reduces the low frequency signal components of the data signal, thus leaving total transmit power unchanged for the resulting transmitted signal. As a result, the transmit pre-emphasis filter effectively cancels the channel response to result in a flat spectrum for the transmitted signal upon arrival at the other end of the local loop. As used herein, the term "flat spectrum" is defined to mean that the frequency spectrum of the respective signal is equal to a constant, e.g., 1, over a pre-defined frequency bandwidth, e.g., the measured frequency bandwidth of the respective channel, before significant roll-off occurs. The goal in transmit pre-emphasis is to match the characteristics of the local loop, i.e., so that the central office receives a signal with a flat spectrum. Transmit pre-emphasis techniques include fixed pre-emphasis wherein the transmit filter provides a fixed response, or adaptive pre-emphasis wherein the transmit pre-emphasis filter provides a frequency response that is calculated anew for each data connection. U.S. Pat. No. 5,008,903 issued Apr. 16, 1991 to Betts et al. is illustrative of one type of adaptive transmit pre-emphasis technique.

As noted above, the transmit pre-emphasis technique effectively cancels the channel response to result in the central-office-end of the local loop receiving a data signal with a flat spectrum. However, the equipment in the central office does not use pre-emphasis in transmitting signals from the central office to the modem. Consequently, the modem receives high-speed data signals severely attenuated at the band-edge. In the modem, an equalizer, as known-in-the-art, is used to compensate for intersymbol interference present in the received data signal caused by channel attenuation. This compensation by the equalizer includes amplitude correction of the received data signal.

In an echo-canceling high-speed modem, a receiver section includes, among other elements, an echo canceler, to remove echo, and the above-mentioned equalizer. The echo canceler first processes the received data signal to remove any echo signal from the received data signal. Unfortunately, since the received data signal is attenuated by the channel at the band-edges, the echo canceler does not effectively remove components of the far-echo signal at the band-edge (assuming that any channel noise is smaller than the residual echo). As a result, the equalizer, which next processes the received data signal, then attempts to boost the echo-canceled received data signal at the band-edges to compensate for the channel attenuation. Since the echo-canceled received data signal still includes a residual far-echo signal at the band-edges, the residual far-echo signal is also boosted by the equalizer. This effectively results in the introduction of "colored noise" into the remaining components of the receiver, which limits the performance of the high-speed echo-canceling modem.

SUMMARY OF THE INVENTION

Therefore, and in accordance with the invention, we have realized that in a high-speed echo canceling modem, additional performance improvements are possible by providing pre-emphasis in the receiver. That is, adding a pre-emphasis filter to the receiver portion of the modem.

In an embodiment of the invention, a modem uses pre-emphasis in both the transmitter and receiver sections. In particular, the receiver section of the modem processes a received signal with a pre-emphasis filter before performing echo cancellation on the received signal. This results in boosting the received signal at the band-edges before processing by the echo canceler, which more effectively removes any far-echo located at the band-edge before subsequent processing by the equalizer. The receiver pre-emphasis filter is identical to the transmitter pre-emphasis filter, i.e., the pre-emphasis added in the receiver is the same as the pre-emphasis added in the transmitter.

In accordance with a feature of the invention, receiver pre-emphasis also improves timing recovery as a result of the sharpening of the echo-canceled received signal at the band edges.

DETAILED DESCRIPTION

Figure 1:
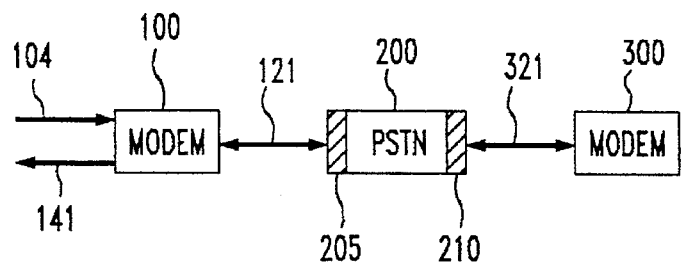
FIG. 1 is a block diagram of a data communications system embodying the principles of the invention.

FIG. 1 shows an illustrative block diagram of a data communications system embodying the principles of the invention. It is assumed that a switched data connection, as known in the art, has already been established between modem 100 and far-end modem 300. A near-end data signal is applied to modem 100 for transmission to far-end modem 300. This near-end data signal is provided by data terminal equipment (not shown) coupled to modem 100 via line 104. Modem 100 processes this near-end data signal, as described below, and applies a modulated near-end data signal to local-loop 121, which communicates the modulated near-end data signal to central office terminating equipment 205 in PSTN 200. The latter routes the modulated near-end data signal to far-end central office terminating equipment 210, which transmits this signal to far-end modem 300 via far-end local-loop 321. Similarly, in the opposite direction, far-end modem 300 sends information to modem 100. In particular, local-loop 121 provides a modulated far-end data signal to modem 100, which processes this signal, as described below, to provide a far-end data signal to data terminal equipment (not shown) via line 141. Although far-end modem 300 may also embody the principles of this invention, only modem 100 is described in detail below. It is assumed that modem 300 similarly uses transmit pre-emphasis to compensate for far-end local-loop 321.

Figure 2:
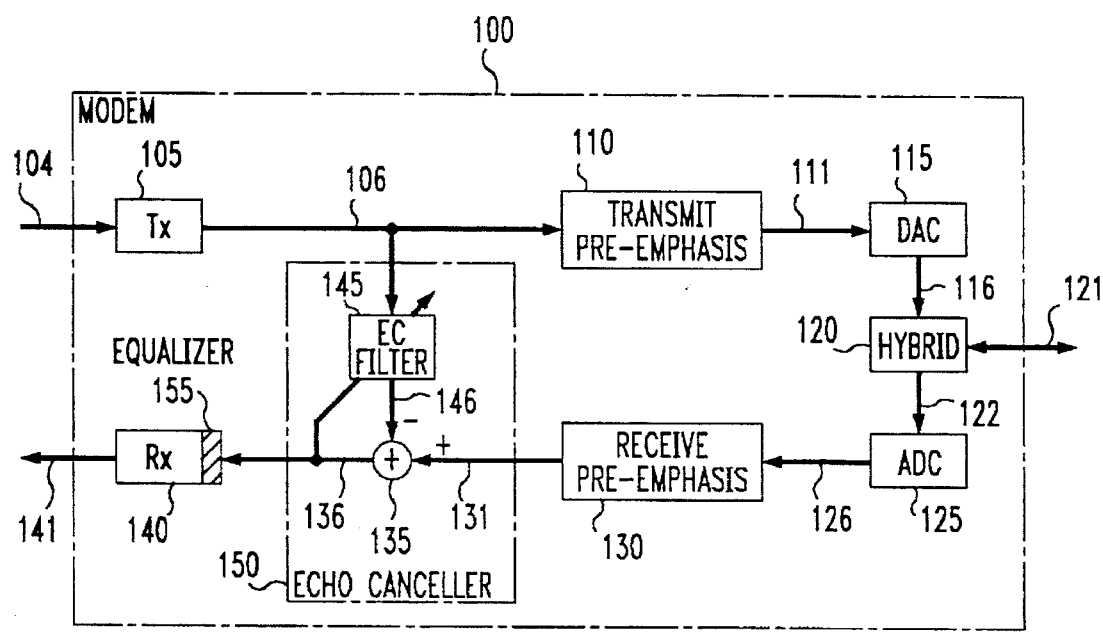
FIG. 2 is an illustrative block diagram of modem 100 of FIG. 1 embodying the principles of the invention.

An illustrative embodiment of modem 100, which embodies the principles of the invention, is shown in FIG. 2. Other than the inventive concept, the elements of modem 100 are well-known and will not be described in detail. Modem 100 includes transmitter section (Tx) 105, transmit pre-emphasis filter (transmit pre-emphasis) 110, digital-to-analog converter (DAC) 115, hybrid 120, analog-to-digital converter (ADC) 125, receive pre-emphasis filter (receive pre-emphasis) 130, echo canceler 150 and receiver section (Rx) 140. It is assumed that modem 100 is a high-speed modem, e.g., supports ITU-T (The International Telecommunication Union—Telecommunications Standardization Section) standard V.34.

A near-end data signal, e.g., a binary input data sequence $\{x_k\}$, is applied to modem 100 via line 104 for transmission to far-end modem 300. Tx 105 processes this near-end data signal as known in the art, to provide a sequence of complex-valued symbols $\{a_n\}$ at a nominal rate of 1/T symbols per second, which are representative of the input data sequence and may also include scrambling, redundancy, and other forms of encoding. Illustratively, modem 100 employs quadrature amplitude modulation (QAM). Since modem 100 is a high-speed modem, symbol sequence $\{a_n\}$ is then filtered by transmit pre-emphasis 110, which compensates for the channel response of local-loop 121. It is assumed that transmit pre-emphasis 110 functions as in the prior art and boosts the high frequency components of the signal on line 106 and reduces the low frequency signal components of the signal on line 106, thus leaving total transmit power unchanged for the resulting transmitted signal. The output signal of transmit pre-emphasis 110 is applied to DAC 115. It is assumed that DAC 115 not only converts the sequence of complex-valued symbols $\{a_n\}$ from the digital to analog domain, but also, for simplicity, includes any additional band-pass filtering of the resulting analog signal to provide a modulated near-end data signal on line 116. Hybrid 120 couples the modulated near-end data signal to local-loop 121.

In the other direction of communication, a modulated far-end data signal is coupled from local-loop 121 by hybrid 120 and applied to ADC 125. It is assumed that ADC 125 not only converts the modulated far-end data signal from the analog to digital domain, but also includes any additional band-pass filtering of the modulated far-end data signal to provide a received signal, r(t) to echo canceler 150, via receive pre-emphasis 130. The received signal, r(t), is a sequence of samples and is corrupted by so-called near and far echoes. The near echoes comprises transmit signal energy which, rather than having been directed to the channel by hybrid 120, has leaked through the hybrid. The far echoes are comprised of signal energy which was directed onto local-loop 121 in the first instance but was reflected back to modem 100 as a result, for example, of impedance mismatches and other channel anomalies.

Accurate recovery of the far-end data signal represented by the received signal, r(t,), requires the removal of the echo energy present in the received signal, r(t). As known in the art, echo canceler 150 removes the echoes from the received signal, r(t). Echo canceler 150 includes echo canceler filter (EC) 145 and adder 135. EC 145 forms an echo estimate signal, which approximates the actual echo signal present in the received signal, r(t). EC 145 forms the echo estimate signal by filtering the sequence of complex-valued symbols $\{a_n\}$. The transfer function of EC 145 is adaptively determined so as to emulate the "echo path." As known in the art, EC 145 adapts by performing updates, i.e., of its coefficients, as a function of an error signal, which is the output signal from adder 135. It should be noted that in practice two echo cancelers are typically used to remove the echo, a near-echo canceler and a far-echo canceler. The near-echo canceler forms a near-echo estimate, while the far-echo canceler forms a far-echo estimate. In addition, the far-echo canceler typically compensates for group delay introduced by local-loop 121 and may have to take into account any frequency translation effects also introduced by PSTN 200. However, for simplicity, echo canceler 150 herein represents both the near, and far, echo cancelers.

Before describing the inventive concept, the prior art will be briefly described. For the moment, the presence of receive pre-emphasis 130 in FIG. 2 will be ignored and it will be assumed that the received signal, r(t), is directly applied to echo canceler 150.

In the prior art the received signal, r(t), is processed by echo canceler, e.g., echo canceler 150, to remove any echo signal by simply subtracting the echo estimate signal from the received signal, r(t), via adder 135. However, since the received signal, r(t), is attenuated by the communications channel at the band-edges, the echo canceler does not effectively remove components of the far-echo signal at the band-edge (assuming that any channel noise is smaller than the residual echo). As a result, the echo-canceled received signal still includes a residual far-echo signal at the band-edges. This signal is applied to a receiver section, herein represented by Rx 140. As known in the art, Rx 140 includes equalizer 155. The latter attempts to boost the echo-canceled received signal at the band-edges to compensate for the channel attenuation. Since the echo-canceled received signal still includes a residual far-echo signal at the band-edges, the residual far-echo signal is also boosted by equalizer 155. This noise enhancement by equalizer 155 effectively results in the introduction of "colored noise" into the remaining components of the receiver, which limits the performance of the high-speed echo-canceling modem.

We have realized that in a high-speed echo canceling modem, the goal is to have a flat spectrum for the input signal applied to the equalizer and the echo canceler. Therefore, and in accordance with the invention, additional performance improvements are possible by providing pre-emphasis in the receiver. That is, adding a pre-emphasis filter to the receiver portion of the modem. This is represented in FIG. 2 by receive pre-emphasis 130. The latter element pre-emphasizes the received signal, r(t), before processing by equalizer 155. Receive pre-emphasis 130 boosts the high frequency components of the received signal and reduces the low frequency signal components of the received signal. In this embodiment, the transfer function of receive pre-emphasis 130 is identical to the transfer function of transmit pre-emphasis 110, i.e., the same filter coefficients are used in transmit pre-emphasis 110 and receive pre-emphasis 130. The transfer function of transmit pre-emphasis 110 is equal to $$\frac{1}{H_{121}(f)},$$

where $H_{121}(f)$ represents the channel response of local-loop 121. Consequently, this same transfer function is used by receive pre-emphasis 130. Although the channel response of local-loop 121, $H_{121}(f)$, can be measured in different ways, for the purposes of this example, it is assumed that this channel response is measured during training. For example, in the above-mentioned ITU-T V.34 a "probe signal," a sequence of predefined tones, is transmitted between modems during the training sequence. Further, the measured spectrum of the probe signal is typically performed in decibels (dB), which is logarithmic. Therefore any division as represented by $$\frac{1}{H_{121}(f)}$$

is simply performed by a subtraction of the values in dB.

The signal provided by receive pre-emphasis 130 on line 131 is represented as rp(t). The frequency response of this signal is equal to:

$$RP(f) = (H_{121}(f) \cdot H_{200}(f) \cdot H_{321}(f) \cdot TP_{300}(f) \cdot FD_{300}(f)) \frac{1}{H_{121}(f)}, \quad (1)$$

where $H_{200}(f)$ represents the channel response of PSTN 200, $H_{321}(f)$ represents the channel response of far-end local loop 321, $TP_{300}(f)$ represents the transmit pre-emphasis added by modem 300, and $FD_{300}(f)$ is the far-end modulated data signal, i.e., before modem 300 adds transmit pre-emphasis. For the purposes of analysis, it is assumed that $FD_{300}(f)$ is ideally flat, i.e., equal to 1. In addition, for most real systems with flat white noise, it can be assumed that the channel response of PSTN 200 is flat, i.e., $H_{200}(f)=1$. Consequently, $$RP(f) = (H_{121}(f) \cdot H_{321}(f) \cdot TP_{300}(f)) \frac{1}{H_{121}(f)} \quad (2)$$

Since, in accordance with the invention, the goal is to obtain a signal with a flat spectrum, i.e., RP(f)=1, at the input to echo canceler 150, the frequency response function of $TP_{300}(f)$ must be equal to $$\frac{1}{H_{321}(f)},$$

i.e., modem 300 performs transmit pre-emphasis to compensate for far-end local loop 321, as noted earlier. In other words, in most cases the transmit and receive pre-emphasis of a modem only needs to compensate for the respective local-loop in order to provide an input signal that has an approximately flat spectrum to echo canceler 150. As a result, echo canceler 150 more effectively removes any far-echo signal present in the received data signal at the band-edges. The echo-canceled signal applied to Rx 140, via line 136, not only has less residual echo, but the flatter spectrum of this signal reduces the amount of equalizer noise enhancement since equalizer 155 now performs less amplitude correction to the received signal, as in the prior art, to compensate for the channel response of local-loop 121. The noise enhancement effectively occurs in receive pre-emphasis 130 and noise enhancement of any residual echo is avoided.

In accordance with a feature of the invention, the use of receiver pre-emphasis in a high-speed echo-canceling modem also improves timing recovery in the modem. In particular, as known in the art, timing recovery is typically performed on the signal applied to the equalizer. In the above example, the signal used for timing recovery is the echo-canceled signal applied to Rx 140. As mentioned above, in the prior art, i.e., without the use of receive pre-emphasis, the echo-canceled signal applied to Rx 140 has significant roll-off at the band-edges. Unfortunately, roll-off affects the ability of Rx 140 to recover timing from the echo-canceled received signal. However, the use of receive pre-emphasis ideally provides a signal with a flatter spectrum to the equalizer. In other words, receive pre-emphasis sharpens, or amplifies, the band-edges, which thereby improves the ability of Rx 140 to recover timing information from the echo-canceled received signal.

As described-above, it was assumed that the channel response of PSTN 200 was approximately flat. This simplified the type of transmit and receive pre-emphasis performed in modem 100, e.g., receive pre-emphasis 130 was identical to transmit pre-emphasis 110. Although this assumption is true for most real systems with flat white noise injected by the telephone network, it should be realized that the inventive concept provides for compensation for any filtering in the network, for non-white network noise, or even for different type modems, e.g., with precoding. Only the respective transmit and receive pre-emphasis functions must be defined to ensure an input signal with a flat spectrum to the echo canceler.

For example, assume that PSTN 200 adds non-flat noise. The signal received by modem 100 can be modeled as comprising a noise signal, $n_{100}(t)$, and a received data signal, $s_{100}(t)$. The noise signal, $n_{100}(t)$, is equal to the noise signal measured by modem 100 and has a corresponding frequency spectrum of $N_{100}(f)$. Similarly, the received data signal, $s_{100}(t)$, is equal to the received data signal measured by modem 100 and has a corresponding frequency spectrum of $S_{100}(f)$. It is assumed that modem 100 measures the corresponding frequency spectrums, $N_{100}(f)$ and $S_{100}(f)$, using prior art techniques. For example, one could transform the equalizer error signal to determine the noise spectrum, or, as mentioned above, ITU-T standard V.34 can be used. In ITU-T V.34 a "probe signal," a sequence of predefined tones, is transmitted between modems during the training sequence to measure $S_{100}(f)$ and $N_{100}(f)$. From these signals, in ITU-T V.34, a local-modem measures the amount of transmit pre-emphasis that should be provided by the far-end modem. The local-modem then sends a set of coefficients back to the far-end modem via the ITU-T V.34 protocol. This set of coefficients is used by the far-end modem in its transmit pre-emphasis filter to provide the transmit pre-emphasis calculated by modem 100. As a result, each modem can suitably adjust the transmit pre-emphasis of the respective far-end modem.

Returning to this example, during training there is no pre-emphasis in any transmitted and received signals. The noise signal, $N_{100}(f)$, can be defined as:

$$N_{100}(f) = H_{121}(f) \cdot N_{200}(f), \quad (3)$$

where $N_{200}(f)$ is the non-flat noise added by PSTN 200. From equation (3), the noise signal received, and measured, by modem 100 is simply equal to the non-flat noise added by PSTN 200 multiplied by the channel response of local-loop 121 on this noise signal. Although not stated in the ITU-T V.34 standard, we have realized that the spectral content of the received signal during the intervals of silence, i.e., between the sequence of predefined tones, is, generally, representative of the spectrum of $N_{100}(f)$.

Further, the received data signal, $S_{100}(f)$, as measured by the sequence of tones, can be defined as:

$$S_{100}(f) = H_{121}(f) \cdot H_{321}(f), \quad (4)$$

where, again it is assumed that the response of PSTN 200 to the far-end transmitted data signal is flat, i.e., $H_{200}(f)=1$, and that the far-end modulated data signal spectrum is also flat, i.e., $FD_{300}(f)$ is equal to 1.

Ideally, taken together, any transmit pre-emphasis performed in far-end modem 300 and receive pre-emphasis performed in modem 100 should perfectly flatten the signal that is input to echo canceler 150, i.e., $RP(f)=1$. In this more general example we desire a flat noise spectrum and receive pre-emphasis 130 is chosen to compensate for the network noise, $N_{200}(f)$, and local-loop 121. That is, receive pre-emphasis 130 is equal to $$\frac{1}{H_{121}(f)N_{200}(f)}.$$

This value is directly measured by measuring the noise spectrum during the probe signal sequence described above. Consequently, during data communications, when pre-emphasis is provided, the total signal provided by receive pre-emphasis 130 on line 131 is equal to:

$$RP(f) = \frac{1}{H_{121}(f)N_{200}(f)} (S_{100}(f) \cdot TP_{300}(f)), \quad (5)$$

where $TP_{300}(f)$ represents the transmit pre-emphasis added by modem 300. Making the suitable substitutions, equation (5) becomes:

$$RP(f) = \frac{1}{H_{121}(f)N_{200}(f)} (H_{121}(f)H_{321}(f)TP_{300}(f)), \text{ or} \quad (6)$$

$$RP(f) = \frac{H_{321}(f)TP_{300}(f)}{N_{200}(f)} \quad (7)$$

Again, since the goal is to obtain a signal with a flat spectrum, i.e., $RP(f)=1$, at the input to echo canceler 150, the frequency response function of $TP_{300}(f)$ must be equal to $$\frac{N_{200}(f)}{H_{321}(f)}.$$

Once modem 100 determines $N_{200}(f)$ from equation (3), modem 100 transmits coefficients representing $$\frac{N_{200}(f)}{H_{321}(f)}$$

to modem 300 for use by modem 300 in its far-end transmit pre-emphasis. For example, ITU-T V.34 provides a method for one modem to send transmit pre-emphasis data to the opposite modem. It should be noted that in the case of $N_{200}(f)$ being flat, that the transmit pre-emphasis of modem 300, $TP_{300}(f)$, simply reduces to compensating for local-loop 321 as described earlier. In the opposite direction, modem 300 performs a complementary process during training. In particular, modem 300 sets its far-end receive pre-emphasis to $$\frac{1}{H_{321}(f)N_{200}(f)},$$

and sends to modem 100 a set of coefficients representing $$\frac{N_{200}(f)}{H_{121}(f)}$$

for use by modem 100 in transmit pre-emphasis 110.

Similarly, the inventive concept is applicable to a modem that uses pre-coding techniques. Typically, in pre-coding there is no transmit pre-emphasis, i.e., the transmit signal spectrum is, ideally, flat. Therefore, in accordance with the inventive concept, the receive pre-emphasis filter inverts the full signal spectrum. Assuming that PSTN 200 only introduces flat white noise, and that the channel response of PSTN 200 is flat, i.e., $H_{200}(f)=1$, the amount of receive pre-emphasis is equal to $$\frac{1}{H_{121}(f)H_{321}(f)}.$$

In this example, receive pre-emphasis now boosts the received noise signal by $$\frac{1}{H_{321}(f)}$$

causing network noise enhancement but preventing residual echo enhancement. The pre-coder of the modem will operate to reduce this noise enhancement. Further, this amount of receive pre-emphasis will cause constellation expansion at the equalizer input and output. This constellation expansion is the same as occurs in a conventional pre-coded system.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., an echo canceler, etc., the functions of any one or more of those building blocks can be carried out using one or more appropriate programmed processors, e.g., a digital signal processor. In addition, although the inventive concept was illustrated in the context of particular shaping functions for use in the receive pre-emphasis filter, these are merely illustrative and other forms of shaping may be provided by the receive pre-emphasis filter.

What is claimed:

1. An improved data communications equipment apparatus for receiving a data signal, the apparatus comprising a receiver including an echo canceler means for processing an echo-corrupted signal to provide an echo-canceled signal, and an equalizer means for processing the echo-canceled signal to compensate for intersymbol interference present in the received data signal, wherein the improvement comprises:

pre-emphasis means located in the receiver for processing the received data signal to provide the echo-corrupted signal, said pre-emphasis means for receiving a pre-defined signal, and for evaluating said predefined signal in order to determine a spectral response of a communications channel and to set said pre-emphasis means to an inverse value of a portion of the determined spectral response.

2. The apparatus of claim 1 wherein the receiver means further comprises:

echo-canceler means for processing the pre-emphasized signal to provide an echo-canceled signal; and equalizer means for processing the echo-canceled signal to compensate for the intersymbol interference.

3. Data communications equipment apparatus comprising:

receiver means for receiving a data signal from a communications channel;

means located in the receiver means for pre-emphasizing the received data signal to provide a pre-emphasized signal, said means for receiving a predefined signal, and for evaluating said predefined signal in order to determine a spectral response of a communications channel and to set said means to an inverse value of a portion of the determined spectral response; and receiver means for equalizing the pre-emphasized signal to compensate for intersymbol interference.

4. A method for use in data communications equipment having a receive pre-emphasis section, the method comprising the steps of:

receiving a pre-defined signal over a communications channel from a far-end data communications equipment;

evaluating the received pre-defined signal to determine a spectral response of the communications channel; and setting a receive pre-emphasis filter of the data communications equipment to an inverse value of a portion of the determined spectral response.

5. The method of claim 4 wherein the setting step sets filter coefficients of the receive pre-emphasis filter to a set of values representative of the portion of the determined spectral response.

6. A method for use in data communications equipment having a receive pre-emphasis section, the method comprising the steps of:

receiving a predefined signal over a communications channel from a far-end data communications equipment;

evaluating the received predefined signal to determine a spectral response of the communications channel;

setting a receive pre-emphasis filter of the data communications equipment to an inverse value of a portion of the determined spectral response; and sending the remaining portion of the determined spectral response to the far-end data communications equipment for use in a far-end transmit pre-emphasis filter of the far-end data communications equipment.

7. The method of claim 6 wherein the sending step sends a set of filter coefficients representative of the remaining portion of the determined spectral response.

* * * * *